Oct. 19, 1965  E. CRANKSHAW ETAL  3,212,831
BEARING FOR ROTATING MEMBER
Filed June 13, 1962  3 Sheets-Sheet 1

INVENTORS
EDWIN CRANKSHAW
JOHN E. STRICKLIN

BY John Wade Bell Jr.
ATTORNEY

Oct. 19, 1965   E. CRANKSHAW ETAL   3,212,831
BEARING FOR ROTATING MEMBER
Filed June 13, 1962   3 Sheets-Sheet 2

INVENTORS
EDWIN CRANKSHAW
JOHN E. STRICKLIN

BY John Wade Ball Jr.
ATTORNEY

Oct. 19, 1965     E. CRANKSHAW ETAL     3,212,831
BEARING FOR ROTATING MEMBER
Filed June 13, 1962     3 Sheets-Sheet 3
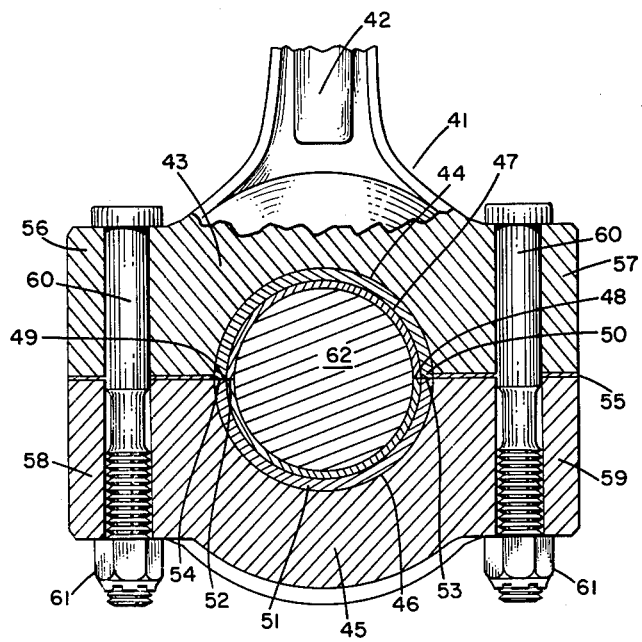
FIG. 4
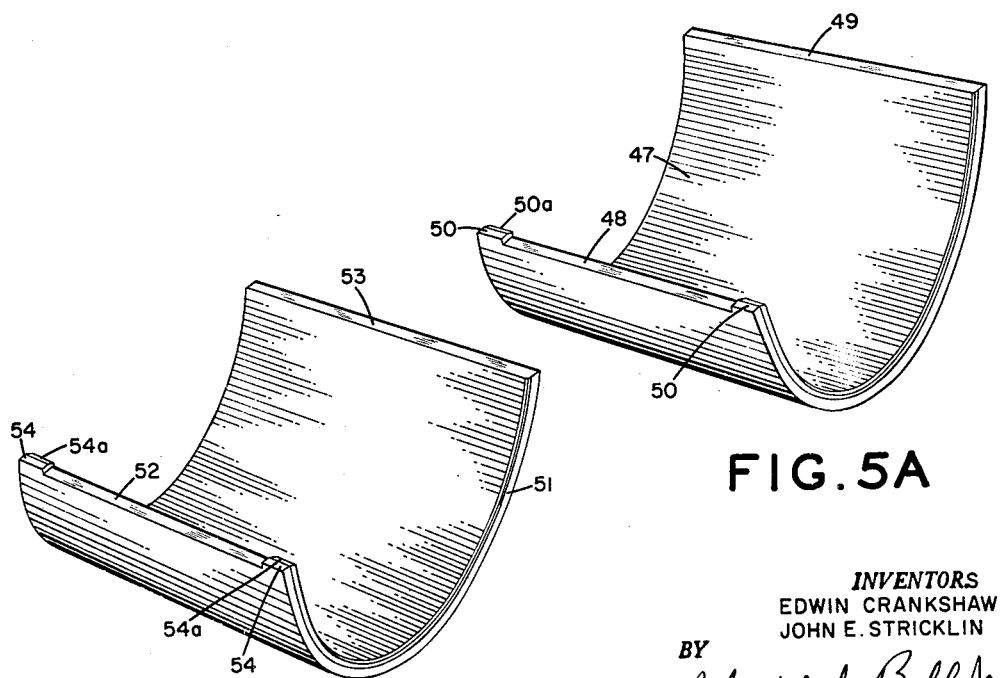
FIG. 5
FIG. 5A
INVENTORS
EDWIN CRANKSHAW
JOHN E. STRICKLIN
BY John Wade Ball Jr.
ATTORNEY United States Patent Office 3,212,831
Patented Oct. 19, 1965

3,212,831
BEARING FOR ROTATING MEMBER
Edwin Crankshaw, Beachwood Village, and John E. Stricklin, Mentor, Ohio, assignors to Clevite Corporation, a corporation of Ohio
Filed June 13, 1962, Ser. No. 202,261
3 Claims. (Cl. 308—22)

This invention relates to bearings for rotating members.

An object of the invention is to provide a means of keeping a bearing stationary in a bore of a housing.

For a better understanding of the present invention, together with other and further objects thereof, reference is had to the following description taken in connection with the accompanying drawings, and its scope will be pointed out in the appended claims.

With reference to the drawings there is shown in FIGURE 1 an isometric partially cut away drawing of the railway car journal bearing of the present invention;

FIGURE 4 is a cross sectional view through the end of a connecting rod and a crankpin of the crankshaft of an internal combustion engine;

FIGURE 5 is a perspective view of the upper bearing shown in FIGURE 4; and

FIGURE 5A is a perspective view of the lower bearing shown in FIGURE 4.

In the present invention, a railway car journal bearing has an upper housing section provided with a semi-cylindrical bore and a semi-cylindrical bearing is disposed in the bore and a lower housing section has a well and the railway car axle journal is disposed in the bearing and the well and a gasket is disposed between the upper and lower housing section and securing means holds the upper and lower housing sections together. It would require a tremendous force to both seat the bearing in the bore of the upper housing section and to seal the gasket between the upper and lower housing sections. A plurality of spaced lugs are formed on the parting line faces of the bearing and when the securing means are tightened the lugs are compressed and decrease in height and urge the bearing against the wall of the bore in the upper housing section with a force sufficient to hold the bearing stationary with respect to the upper housing section. This enables the securing means to apply the required force to seal the gasket between the upper and lower housing sections. This principle of holding a bearing stationary in a housing may also be applied to other bearing applications such as a crankshaft of an internal combustion engine and is applicable to a split cylindrical bearing as well as to a semi-cylindrical bearing. If the bearing is allowed to move with respect to the housing while the member is rotating, uneven wear on the bearing would result with immediate destruction of the bearing and scoring of the member by the bearing. This is why the bearing must be held stationary with respect to its housing.

Figure 1:
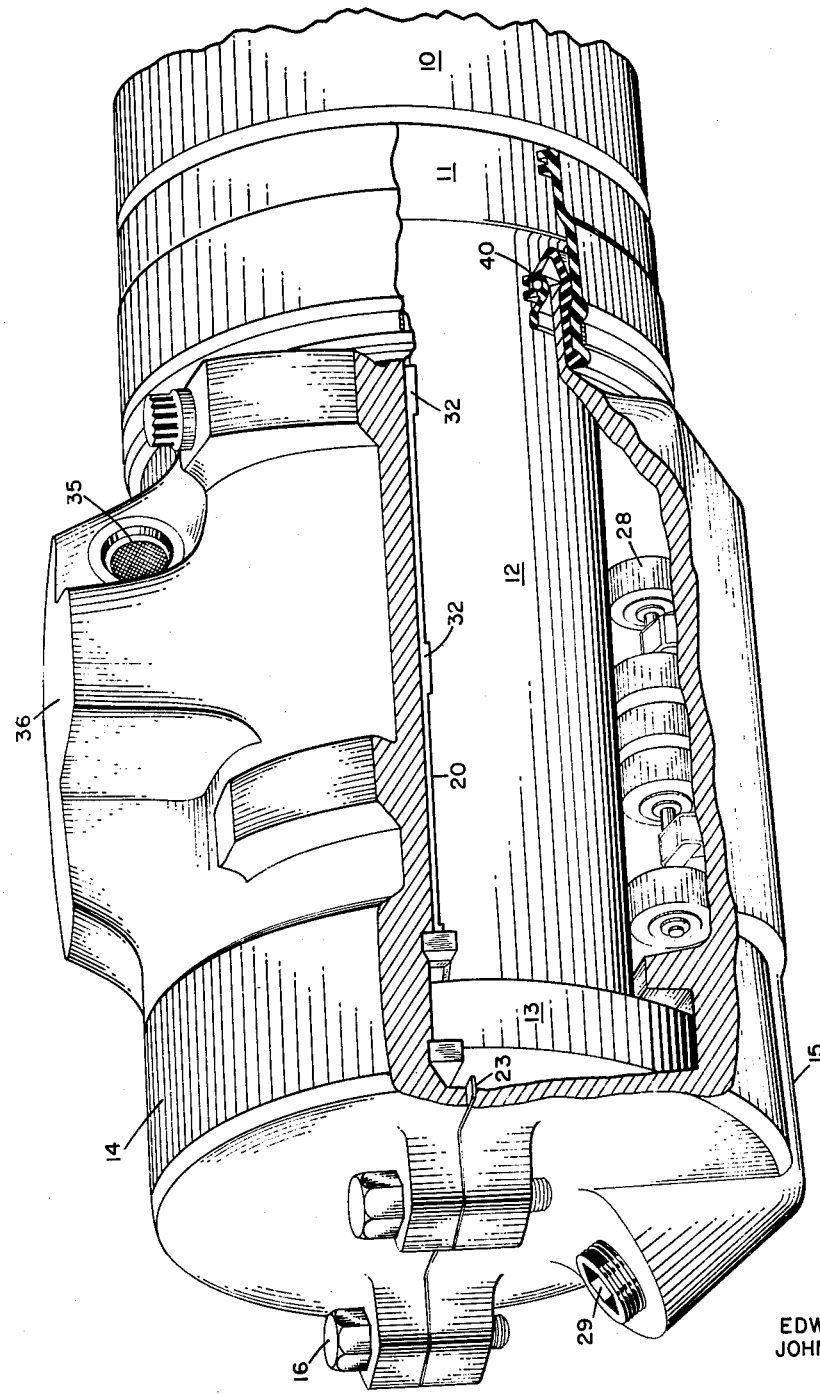
Figure 2:
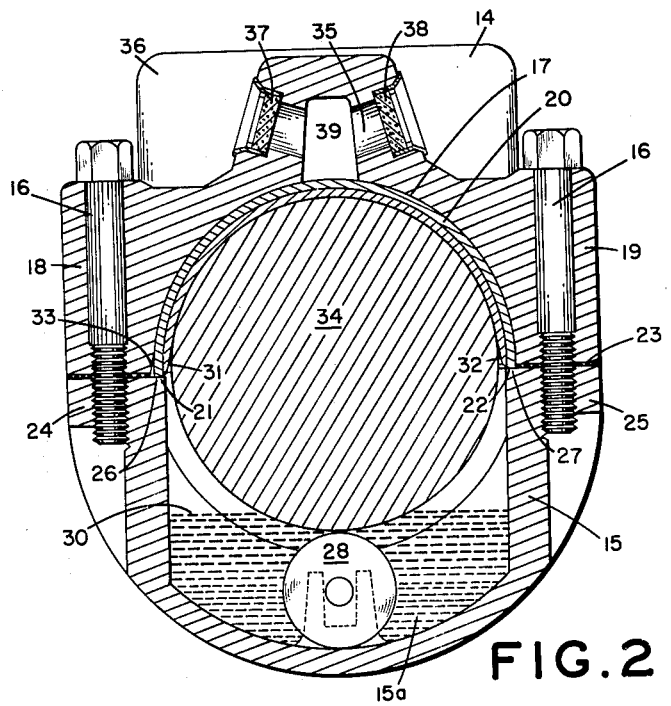
FIGURE 2 is a cross sectional view through the railway car journal bearing.
Figure 3:
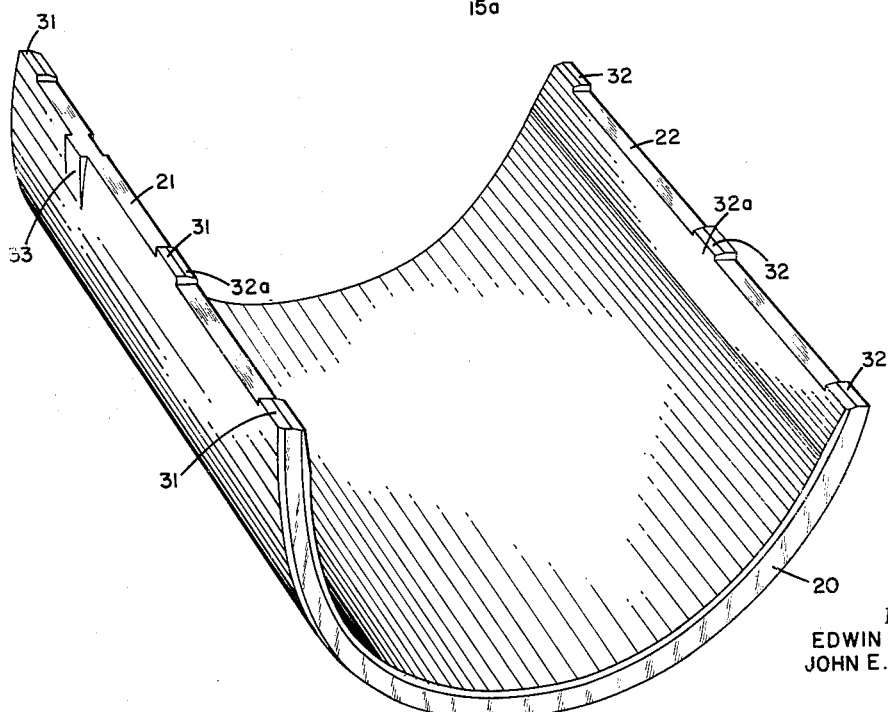
FIGURE 3 is a perspective view of the semi-cylindrical bearing shown in FIGURES 1 and 2.

In FIGURES 1, 2 and 3 of the drawings, 10 designates the axle of a railway car having a given diameter. The axle 10 has a dust guard seat portion 11 reduced in diameter from the given diameter and a second portion 12 called the journal which preferably is reduced in diameter below the diameter of the axle portion 11 and which terminates at its outboard end in a thrust collar 13.

Around the journal 12 there is mounted a heavy cast metal housing formed of complementary upper and lower housing sections 14 and 15 connected together by a plurality of bolts 16 along a parting line which preferably extends in a direction parallel to the axis of the journal 12. Both of the housing sections are made of heavy cast metal. The upper housing section 14 is provided with a semi-cylindrical bore 17 and a pair of clamping elements 18 and 19 and a semi-cylindrical bearing 20 which has parting line faces 21 and 22. The bearing 20 is made of a hard outer layer of one material and a softer inner layer of a different material. A gasket 23 has holes which receive the bolts 16 and has one face disposed against the ends of the clamping elements 18 and 19 on the upper housing section 14. The lower housing section 15 has a well 15a and a pair of clamping elements 24 and 25 which bear against the other face of the gasket 23 and these clamping elements extend farther inwardly than do the clamping elements 18 and 19 to form ledges 26 and 27.

Means such as the spring biased felt roller device 28 is mounted in the bottom of the housing and is maintained in contact with the underneath surface of the journal 12 to apply lubricant thereto. A lubricant such as oil is poured through an opening 29 in the lower housing section 15 and the lower housing section forms a reservoir for the oil. The oil level is indicated by the line 30.

The bearing 20 has a plurality of lugs 31 and 32 integral therewith on its parting line faces 21 and 22, respectively. The bearing 20 also has a lug 33 adjacent its parting line face 21 which engages the lower housing section 15 to prevent rotation of the bearing about its longitudinal axis 34. The lugs 31 and 32 each have a given height measured along the outside surface of the bearing 20 and each of the lugs 31 and 32 has a lesser height measured along the inside surface of the bearing. This is produced by having a sloping surface at 32a. The lugs 31 and 32 are cut away at 32a so that the metal will not be displaced toward the center of the journal 12 and score the journal.

To assemble the arrangement shown in FIGURES 1 to 3 the bearing 20 is placed in the bore 17 in the upper housing section 14 and then the bearing is laid upon the journal 12. The gasket 23 is placed against the clamping elements 18 and 19 of the upper housing section 14 and then the lower housing section 15 is placed against the gasket. The bolts 16 are then placed in the holes in the upper housing 14 and passed through holes in the gasket and threaded into internally threaded holes in the lower housing section 15. When the bolts 16 are tightened the lugs 31 and 32 bear against the ledges 26 and 27 to elastically deform the lugs and bearing shell to apply a seating force to the bearing sufficient to seat it adequately in the upper housing section 14 so as to hold it stationary in the upper housing section, and the lugs are plastically deformed to compress the gasket between the upper and lower housing sections to prevent gasket displacement and to seal together the upper and lower housing sections.

With the substantially complete sealing of the journal within the housing it becomes very important to vent the housing. This need arises due to the piston-like action of the journal as it moves in and out of the housing by a distance up to about ⅞ of an inch. Each longitudinal movement of the journal results in displacement of a quantity of air. In order to keep this displaced air from breaking through the oil seal with consequent oil pumping, a vent 35 has been provided in the housing for venting the inside of the housing to atmosphere. The vent 35 is located at the top of the upper housing section 14 behind the thick cross-shaped load-bearing member 36 so that the vent is almost completely protected from the elements when the journal housing is in place in a railroad journal box. Also, this location is important since it lies behind the bearing 20 at the top of the unit where the velocity of the oil particles moving around in the housing is at a minimum and consequently pumping air in and out of the vent at this location causes less loss of oil.

The vent 35 comprises two sintered metal discs 37 and 38 assembled into the upper housing section 14 and in communication with passageway 39 which in turn is in communication with a passageway opening to the annular space behind the annular oil seal. The sintered metal discs have a plurality of openings of such a size as to exclude all dirt particles which are .005" or larger in size.

A sealing arrangement is shown at 40 to seal the interior of the housing from the atmosphere.

A modified form of the invention is shown in FIGURES 4, 5 and 5A of the drawings. A connecting rod 41 has a strut 42 and an upper housing section 43 provided with a semi-cylindrical bore 44 and a lower housing section 45 provided with a semi-cylindrical bore 46. An upper semi-cylindrical bearing 47 is seated in the bore 44 of the upper housing section 43 and has parting line faces 48 and 49 and two or more spaced lugs 50 are made integral with the bearing on the parting line face 48. The lugs 50 should be of such size, number and placement on the parting line face as to satisfy the conditions of the particular bearing installation. The bearing 47 has a hard outer layer of one material and a softer inner layer of a different material. A lower semi-cylindrical bearing 51 is seated in the bore 46 of the lower housing section 45 and has parting line faces 52 and 53 and a pair of spaced lugs 54 are made integral with the bearing on the parting line face 52. The bearing 51 has a hard outer layer of one material and a softer inner layer of a different material. A gasket 55 may bear against the clamping elements 56 and 57 of the upper housing section 43. It is not essential that a gasket 55 or shims be positioned between the housing sections. The clamping elements 58 and 59 of the lower housing section 45 bears against the gasket 55. A pair of bolts 60 extend through the upper and lower housing sections 43 and 45 and nuts 61 are threaded on the bolts. A crank pin 62 of a crankshaft of an internal combustion engine rotates in the bearings 47 and 51. The lugs 50 are cut away so that a sloping surface 50a is provided, making the height of lugs 50 greater at the outside surface of bearing 47 than at the inside surface, to prevent flow of metal toward the crank pin 62 of the crankshaft and possible scoring of the material. The lugs 54 are cut away so that a sloping surface 54a is provided making the height of the lugs 54 greater at the outside surface of bearing 51 than at the inside surface to prevent flow of metal toward the crank pin 62 of the crankshaft and possible scoring of the crank pin.

To assemble the arrangement shown in FIGURES 4, 5 and 5A, the upper bearing 47 is placed in the bore 44 in the upper housing section 43 and the bearing is then placed upon the crank pin 62 of the crankshaft. The lower bearing 51 is placed in the bore 46 in the lower housing section 45 and, if used, the gasket 55 is placed against the upper housing section 43. The lower housing section 45 is then placed against the gasket 55 and then the bolts 60 are passed through the holes in the upper and lower housing sections 43 and 45 and then the nuts 61 are threaded on the bolts. When the nuts 61 are tightened, the lugs 54 on lower bearing 51 are forced against parting line face 49 of the upper bearing 47 to elastically deform the bearing shell and lugs 54 to apply a seating force to the upper bearing sufficient to seat it adequately in the upper housing section 43, and the lugs 50 on the upper bearing are forced against parting line face 53 of the lower bearing to elastically deform the bearing shell and lugs 50 to apply a seating force to the lower bearing sufficient to seat it adequately in the lower housing section. Additional tightening of the nuts 61 plastically deforms the lugs 50 and 54 to allow the gasket 55 to be compressed between the upper and lower housing sections 43 and 45 to seal together the upper and lower housing sections and to prevent gasket displacement.

In the specification and claims the term "bore" includes any depression, groove, or recess in the shape of an arc of a circle or any opening or hole extending from 0° to 360° regardless of the method used or the tools used for making the groove or hole such as casting, forging, drilling or machining.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A bearing for a journal member comprising an upper housing section provided with a semi-cylindrical housing bore and a pair of clamping elements having edge faces, a lower housing section provided with a well and a corresponding pair of clamping elements having edge faces, the edge faces of said lower housing section extending inwardly toward said journal more than the edge faces of said upper housing section establishing bearing mounting ledges extending axially parallel to the axis of said journal on both sides thereof, a semi-cylindrical bearing disposed in the bore of the upper housing section, said bearing having spaced apart parting line faces and having a plurality of deformable lugs extending above the surface of at least one of said parting line faces, the said lugs on the parting line face of said bearing engaging at least one of said bearing mounting ledges, a gasket located between the edge faces of said upper and lower housing sections, and a plurality of bolts extending through said clamping elements for tightly securing said housing sections together and for squeezing said gasket therebetween, said bolts being sufficiently tight to deform said lugs decreasing their height above the parting line face of said bearing.

2. A bearing for a journal member as set forth in claim 1, further characterized by said semi-cylindrical bearing having deformable lugs on both of its parting line faces.

3. A bearing for a journal member as set forth in claim 2, further characterized by the height of the lug portion as measured from outside of the bearing being greater than the height of the lug portion as measured from inside of the bearing.

References Cited by the Examiner
UNITED STATES PATENTS

| | | |
|---|---|---|
| 728,547 | 5/03 | Crafts. |
| 1,603,471 | 10/26 | Johnson _____ 29—149.5 |
| 1,913,204 | 6/33 | Larzelere _____ 308—237 |
| 1,948,176 | 2/34 | Hopkins _____ 308—237 |
| 2,923,581 | 2/60 | Wahrenberger _____ 308—79 |

ROBERT C. RIORDON, *Primary Examiner.*

FRANK SUSKO, *Examiner.*